United States Patent Office 3,844,989
Patented Oct. 29, 1974

3,844,989
ANTI-THROMBOGENIC POLYMER COMPOSITIONS WITH INTERNALLY BOUND HEPARIN
Noriho Harumiya, Kamakura, Hajime Miyama, Fujisawa, Hiroshi Tanzawa, Yuichi Mori, and Tadahide Sato, Kamakura, Yasuo Idezuki, Mitaka, and Motokazo Hori, Kamakura, Japan, assignors to Toray Industries, Inc., Tokyo, Japan
No Drawing. Filed Dec. 7, 1972, Ser. No. 313,134
Claims priority, application Japan, Sept. 4, 1971, 46/104,127; Sept. 4, 1972, 47/87,891
Int. Cl. A61k *17/18;* C08b *25/00*
U.S. Cl. 260—17.4 R       3 Claims

ABSTRACT OF THE DISCLOSURE

Anti-thrombogenic polymer compositions of water-insoluble cationic copolymers having hydrophilic components quaternary ammonium components and hydrophobic components, and heparin, and having a negative value of standard membrane potential difference.

---

This invention relates to novel anti-thrombogenic polymer compositions.

Recently, many kinds of polymer compositions have been used in the field of medical supplies. But these comtions have rarely been used as an anti-thrombogenic medical materials for use in prosthetic and therapeutic apparatuses for handling blood under conditions where clotting would tend to occur, such as artificial blood vessels, catheters, artificial hearts, and artificial kidneys.

When blood is brought into contact with plastics, glass or other similar surfaces, it tends to cloth in a short time unless precautions have been taken to prevent this. One common precaution currently under considerable investigation is the treatment of the surface with heparin, a substance known to have anticoagulant properties when in contact with blood. The presence of heparin imparts anti-thrmobogenic characteristics. However, previously known heparinization methods or compositions have not been adequate because of their short time of anti-thrombogenic activity, at most a few days *in vivo*. (c.f. L. S. Hersh et al., J. Biomed. Mater. Res. Symposium *1*, 99–104 [1971]).

Therefore, an object of this invention is to provide novel anti-thrombogenic polymer compositions which prevent blood clotting for a relatively long time (over one month *in vivo*) and thus have excellent properties for use as medical materials such as artificial blood vessels, catheters, artificial hearts and artificial kidneys.

The anti-thrombogenic polymer compositions of this invention comprise water-insoluble cationic copolymers having hydrophilic components (I), quaternary ammonium components (II) and hydrophobic components (III), and heparin, and having a negative value of standard membrane potential difference.

Hydrophilic components (I) are components which give water-soluble polymers by homopolymerization thereof, as is well known in the art. Typical examples of monomers constituting these hydrophilic components are acrylic acid, methacrylic acid, salts thereof, such as sodium acrylate and potassium methacrylate, amides thereof, such as acrylamide and N-methyl acrylamide and alkylene glycol adducts thereof, such as hydroxyethyl acrylate, hydroxyethyl methacrylate, methoxypolyethyleneglycol acrylate and methoxypolyethyleneglycol methacrylate (the number of additions of ethylene glycol is preferably 1 to 30).

Typical examples of monomers constituting the quaternary ammonium salt components (II) are quaternary ammonium salts of vinylpyridines, dimethyl diallyl ammonium halide, diethyl diallyl ammonium halide, and compounds illustrated by the following general formula:

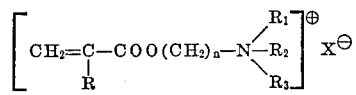

(where $n=2$ or 3, $R=H$ or a hydrocarbon radical such as alkyl, aryl or cycloalkyl having 1 to 18 carbon atoms, and $X^{\ominus}$=an anionic group able to form a salt with amine nitrogen, such as a halogen).

Hydrophobic components (III) are components which give water-insoluble polymers by homopolymerization thereof. Typical examples of monomers constituting hydrophobic components (III) are acrylic acid esters such as methyl acrylate, ethyl acrylate, propyl acrylate, methacrylic acid esters such as methyl methacrylate, acrylonitrile, vinyl acetate, vinyl chloride, vinylidene dichloride, styrene, α-methyl styrene, ethylene, propylene and butadiene.

The cationic copolymers having said hydrophilic components (I), said quaternary ammonium salt components (II) and said hydrophobic components (III) are able to be used in any usual copolymer physical state such as random copolymers, block copolymers, and graft copolymers.

More particularly, random copolymers of components (I), (II) and (III), copolymers produced by graft- or block copolymerizing components (II) to random copolymer of components (I) and (III), copolymers produced by graft- or block copolymerizing components (I) and (II) to homopolymers of components (III) are all exemplified.

The cationic copolymers comprise preferably A weight percent of components (I) (where 30% $\geq A \geq 2\%$), B percent by weight of components (II) (where 40% $\geq B \geq 2\%$ and 50% $\geq (A+B) \geq 10\%$) and C percent by weight of components (III) (where $C+A+B=100\%$).

Preferable embodiments of methods of producing these cation-activated copolymers are as follows:

At least one of the vinyl compounds (II) illustrated by the formula

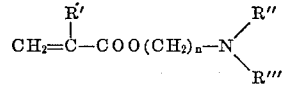

(where R' is H or $CH_3$, R" and R''' are $CH_3$ or $C_2H_5$ respectively, and $n$ is 1, 2 or 3), and at least one of the vinyl compounds (I) illustrated by the formula

(where R' is H or $CH_3$, R" is H, $CH_3$ or $C_2H_5$, and $n$ is 1–30) are graft copolymerized to at least one hydrophobic polymer such as polyvinyl chloride, polyacrylonitrile, polyvinyl acetate, and a copolymer of ethylene-vinyl acetate-vinyl chloride; then the nitrogen atoms of said graft copolymer are converted to quarternary nitrogen atoms by contacting said graft copolymer with at least one quaternizing agent such as alkyl halide, hydrogen bromide and monochloroacetic acid in the usual manner.

The anti-thrombogenic polymer compositions of this invention are produced by combining said cationic copolymers with heparin. In this case, heparin is added in excess of equilibrium to give a standard membrane potential difference of the produced compositions with a negative value (—).

Preferable embodiments for combining heparin with the cationic copolymers are as follows:

The cationic copolymers are produced in the desired shape in the usual manner, and then said shaped articles are dipped in a solution of herapin, preferably at 50–100°

C., to be combined. In this case, the solution of heparin involves preferably more than 20° by weight of water or formaldehyde and at least 0.5% by weight of heparin.

The compositions of this invention exhibit a greatly prolonged anti-thrombogenic time as compared with known heparinized compositions. It appears that heparin, bonded inside the article prepared from the compositions, diffuses gradually and continuously onto the surface of the article.

In the following examples the heparin content of the composition was determined by weight gravimetrically, by dye test, which is semi-quantitative (heparin-Azur A complex has an intense purple color), and by other chemical methods. It is possible to ascertain directly by determining the standard membrane potential (SMP) whether the heparin content is higher than component (II) in chemical equivalent. The SMP is dependent upon the concentration and the polarity of the fixed ionic groups of the samples. In case of excess heparin, the net fixed ion is negative according to $SO_3^-$. SMP is determined in the usual way (cf. Jikken-kagakukōza Vol. 7 p. 347 Maruzen, Japan Chemical Soc. 1961), holding a sample membrane between 0.01 normal KCl and 0.1 normal KCl in aqueous solution and adopting recorder (Rikendenshi SP–G3 type).

Before heparinization, the $N/10$ KCl chamber is more positive than the $N/100$ KCl chamber by $+40-+50$ mv. Depending upon the extent of bonding of the excess heparin, it becomes negative by as much as $-40$ mv. For adequate heparinization, it is necessary to have the excess heparin bonded, and for the SMP to have a negative value, preferably less than $-10$ mv., usually $-10--40$ mv.

By such heparinization, the compositions are found to retain their anti-thrombogenic efficacy for a prolonged period. In order to obtain anti-thrombogenic plastics, it is an indispensable condition that the prepolymer must consist of at least the three components which are characteristic of the invention.

The compositions of this invention (when the SMP has a negative value preferably less than $-10$ mv.) were non-clotting for both the Lee-White test (LWT) and the Recalcification Time Test *in vitro*. *In vivo*, neither clotting on the surface of the tubes nor on the wall of the vein was found. These results show that the compositions of this invention are very superior in continuity of anti-thrombogenic activity to any other known material, including not only silicon resins but also other heparinized materials as well.

Anti-thrombogenicity of these heparin bonded new materials was evaluated with *in vitro* and *in vivo* methods.

*In vitro* tests using the Lee-White clotting time test and the recalcification time test were employed. Lee-White clotting times were measured in test tubes from the compositions of this invention at 37° C. by using fresh whole blood withdrawn from the jugular vein of a dog into a siliconized glass syringe (20 ml.). A two-syringe method was employed in order to prevent contamination by tissue thromboplastin caused by puncture with the needle. Recalcification times were determined by adding calcium chloride to canine ACD plasma in test tubes made from the compositions of this invention at 37° C. The ACD plasma was prepared by centrifuging ACD blood at 1500 r.p.m. for 10 minutes at 0° C. In all cases, about 10 mm. diameter test tubes were used. Siliconized glass tubes were used as control samples, and the Lee-White clotting time and the recalcification time of the control samples were respectively 20–24 minutes and about 5 minutes.

*In vivo* tests using the compositions of this invention were conducted, each using a catheter which was about 400 mm. long with a 3 mm. o.d. The catheters were sterilized with ultra violet light and the inner part of the catheter was filled with sterilized Ringer's solution. The catheters were implanted in the dog's right femoral vein leading to the heart through the inferior vena cava for two weeks. After two weeks the dogs were sacrificed and the thrombi on the surfaces of the catheters and the blood vessels were observed. Ordinary catheters made from polyethylene, tetrafluoromethylene, and silicone rubber were used as control samples. Thrombi along the surfaces of control materials from the inserted part to the renal vein were found.

The following examples are given by way of illustration and comparison and the invention is not limited thereby. In all examples, the results of *in vivo* and *in vitro* tests of the anti-thrombogenic property of the compositions of this invention, are presented in Table I, together with heparin content.

EXAMPLES 1–4

After methoxypolyethylenegylcol methacrylate ($n=25$) (SM) and dimethylaminoethyl methacrylate (DAEM) were grafted to ethylene-vinylacetate-vinyl chloride (1:1:1) copolymer (EVV) in various proportions, these copolymers were quaternized to cationic copolymers by ethyl bromide. Example 1 showed the highest degree of water absorbed (68%) and Example 4 the least (15%).

These prepolymers were plasticized by a dipping method and heparinized at 80° C. in 2% sodium heparin aqueous solution in Examples 1–3 and 2% sodium heparin formamide solution in Example 4 and had the heparin content controlled by varying the soaking time.

The samples whose heparin content was more than DAEM by chemical equivalent and whose SMP showed less than $-10$ mv., were completely anti-thrombogenic *in vitro* and *in vivo* tests.

After the samples that were anti-thrombogenic in Examples 2 and 4 were kept in Ringer's solution for 6 months, they gave the same SMP value as before and were still anti-thrombogenic after more than 60 minutes of an *in vitro* test, showing that their properties had not varied during the 6 months.

The samples whose heparin content was low and whose SMP shoed a positive value were thrombogenic. The sample coated on a polyurethane tube by the composition of Example 2 was anti-thrombogenic too.

The blood of the dogs which had been used in the *in vivo* test was given 10–15 minutes of LWT and remained regular.

Comparison 1 and 2

Comparisons 1 and 2 compositions consisted of the same components as Examples 1–4. But these contained too small an amount of component (I) and (II) to bond excess heparin.

EXAMPLE 5

2 - hydroxyethylmethacrylate (HEMA) and DAEM were grafted to polyvinylchloride (PVC) and this was treated as in Example 1. The composition so obtained was also very anti-thrombogenic.

Comparison 3

When HEMA was omitted from Example 5, the prepolymer could not absorb much water and could not bond the excess heparin. The strength of this copolymer was too weak to run an *in vivo* test.

EXAMPLES 6 AND 7

In Example 6, acrylamide (AAm), dimethylamino ethyl acrylate (DAEA) and acrylonitrile (AN), and in Example 7 acrylic acid (AA) instead of AAm, were copolymerized at random. They were then treated as in Example 1.

The compositions so obtained showed good water transparency, and could be spun. They were both completely anti-thrombogenic.

EXAMPLE 8

After AN and AAm were copolymerized, SM and HEMA were grafted to the copolymer, and then the grafted copolymer was quaternized by chloroacetic acid and was heparinized sufficiently. The tube so obtained was colorless, transparent and anti-thrombogenic.

EXAMPLE 9

Dimethyl diallyl ammonuim chloride (DAA), HEMA, and vinylidene chloride were polymerized at random and the sample so plasticized was anti-thrombogenic.

EXAMPLE 10

Vinylacetate (VAc) and N-vinyl pyrrolidone (NVP) were copolymerized and 4-vinyl pyridine (4 VP) was grafted to them. The resulting copolymer was then quaternized by benzyl chloride. This cation-active copolymer showed 75% by degree of water content and was soft but strong, somewhat rubber-like. After plasticizing and heparinizing, the anti-thrombogenic compositions were obtained.

Comparison 4

Excluding component (III), HEMA and DAEM only were copolymerized at various ratios. All copolymers obtained dissolved in water within 1–10 hours and were not suitable for plasticization.

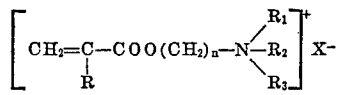

(wherein $n=2$ or 3, R=H or a hydrocarbon radical, $R_1$, $R_2$, $R_3$=a hydrocarbon radical and X=an anionic group able to form a salt with an amine nitrogen, such as a halogen), and said monomer units constituting said hydrophobic components being selected from the group consisting of acrylic acid ester, methacrylic acid ester, acrylonitrile, vinyl acetate, vinyl chloride, styrene, α-methyl styrene, vinylidene dichloride, ethylene, propylene and butadiene, said water-insoluble cationic copolymers consisting essentially of A percent by weight of said hydrophilic component (I) (where $30\% \geq A \geq 2\%$), B percent by weight of said quaternary ammonium salt components, and C percent by weight of said hydrophobic components (III) (wherein $40\% \geq C \geq 2\%$ and $50\% \geq A+C \geq 10\%$), (where $C+A+B=100\%$).

2. An anti-thrombogenic polymer composition consisting essentially of a water-insoluble cationic copolymer produced by quaternizing a graft-copolymer produced by grafting methoxypolyethyleneglycol methacrylate and dimethyl amino ethyl methacrylate onto ethylene-vinylacetate-vinyl chloride with ethyl bromide, and heparin internally bound therein, and having a negative Standard Membrane Potential difference.

3. The composition defined in Claim 1, wherein the Standard Membrane Potential difference is −10 mv. to −40 mv.

TABLE I

| Number | Cationic copolymer | | | | | | Content of heparin wt. percent based on the copolymer | M: standard membrane potential difference (mV) | Anti-thrombogenicity | |
|---|---|---|---|---|---|---|---|---|---|---|
| | Component (I) | Wt. percent | Component (II) | Wt. percent | Component (III) | Wt. percent | | | In vitro[1] | In vivo[2] |
| Ex. 1 | Methoxypoly-ethylene-glycol methacrylate. | 25 | Dimethyl-amino-ethyl-methacrylate-ethyl bromide. | 21 | (Ethylene-vinyl acetate-vinyl chloride) copolymer. | 54 | 5 9.5 | M: +30 M: −10.3 | x o | x o |
| Ex. 2 | do | 20 | do | 10 | do | 70 | 4 7 | M: +30 M: −10 | x o | ([3]) o |
| Ex. 3 | do | 11 | do | 17 | do | 72 | 8 | M: −14 | o | o |
| Ex. 4 | do | 8 | do | 6 | do | 84 | 6 | M: −13.4 | o | o |
| Comp. 1 | do | 3 | do | 4 | do | 93 | 3 | M: +0.1 | x | x |
| Comp. 2 | do | 0 | do | 15 | do | 85 | 2.5 | M: +18 | x | x |
| Ex. 5 | 2-hydroxy ethyl methacrylate. | 12 | Dimethyl-amino-ethyl-acrylate-ethyl bromide. | 9 | Polyvinyl chloride | 79 | 8 | M: −21 | o | o |
| Comp. 3 | | 0 | do | 10–30 | do | 90–70 | 1–4 | M: +2.5 to −8 | x | x |
| Ex. 6 | Acrylamide | 22 | do | 20 | Acrylonitrile | 58 | 5.3 | M: −15 | o | o |
| Ex. 7 | Acrylic acid | 23 | do | 18 | do | 59 | 8 | M: −18 | o | o |
| Ex. 8 | {Acrylamide, Methoxy-polyethyleneglycol methacrylate. | 19 5 | {Dimethyl-amino-ethyl methacrylate-monochloro-acetic acid. | 9 | do | 67 | 6 | M: −13 | o | o |
| Ex. 9 | Hydroxyethyl methacrylate. | 27 | Dimethyldiallyl ammonium chloride. | 12 | {Acrylonitrile, Vinylidene di-chloride. | 43 18 | 8 | M: −19 | o | o |
| Ex. 10 | N-vinyl pyrolidone | 6 | 4-vinyl pyridine benzyl chloride. | 25 | Vinyl acetate | 69 | 12 | M: −16 | o | o |
| Comp. 4 | Hydroxy ethyl methacrylate. | 25–75 | Dimethylamino-ethyl methacrylate. | 75–25 | | 0 | Unshapable because of their water-solubility | | | |

[1] o=Non-thrombogenic; x= thrombogenic within 20 minutes.
[2] o=No clotting over 1 month; x=clotting within 1 week.
[3] No test.

The following is claimed:

1. An anti-thrombogenic polymer composition consisting essentially of water-insoluble cationic copolymers having monomer units comprising (I) hydrophilic components, (II) quaternary ammonium components, (III) hydrophobic components, and heparin internally bound therein, and having a negative Standard Membrane Potential difference, said monomer units constituting the hydrophilic components (I) being selected from the group consisting of acrylic acid, methacrylic acid (MA), a salt of MA, an amide of MA, an alkylene glycol adduct of MA and vinylpyridine, The monomer units constituting said quaternary ammonium salt components (II) being selected from the group consisting of dialkyldiallyl ammonium halide or

References Cited

UNITED STATES PATENTS 3,617,344 11/1971 Leininger et al. ____ 117—138.8
3,717,502 2/1973 Masuhara et al. ____ 117—138.8
3,634,123 1/1972 Eriksson et al. ____ 117—138.8

WILLIAM H. SHORT, Primary Examiner
E. WOODBERRY, Assistant Examiner

U.S. Cl. X.R.

117—47 A, 138.8 A; 260—9, 17.4 GC; 424—183